UNITED STATES PATENT OFFICE.

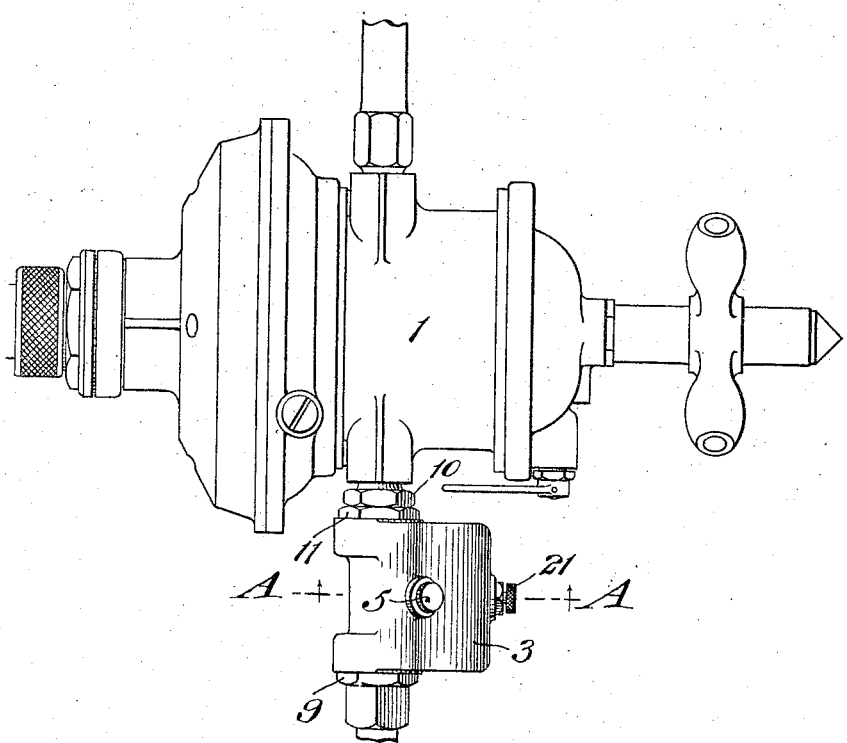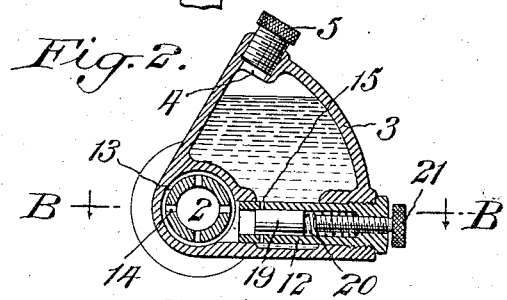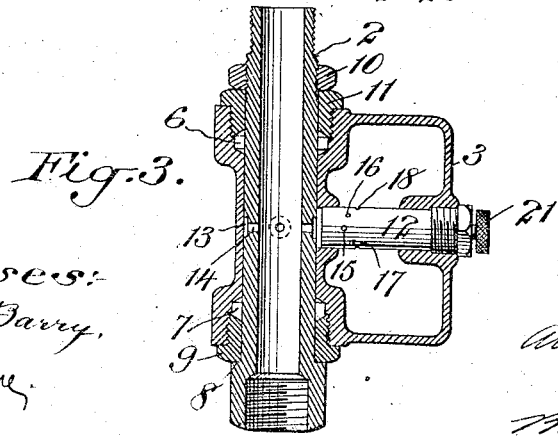

ALBERT H. TAYLOR, OF EASTON, PENNSYLVANIA, ASSIGNOR TO THE INGERSOLL-SERGEANT DRILL COMPANY, OF NEW YORK, N. Y., A CORPORATION OF WEST VIRGINIA.

AUTOMATIC OILER.

No. 810,686.   Specification of Letters Patent.   Patented Jan. 23, 1906.

Application filed July 14, 1905. Serial No. 269,606.

*To all whom it may concern:*

Be it known that I, ALBERT H. TAYLOR, a citizen of the United States, and a resident of Easton, in the county of Northampton and State of Pennsylvania, have invented a new and useful Automatic Oiler, of which the following is a specification.

The object of my invention is to provide an automatic oiler for use in connection with the air-feed pipe of a pneumatic motor, and comprises means under the control of pressure in the pipe for determining the amount of oil which may be supplied to the air within the feed-pipe.

A practical embodiment of my invention is represented in the accompanying drawings, in which—

Figure 1 represents in elevation a pneumatic motor of the rotary piston type with my improved oiler attached to the feed-pipe thereof. Fig. 2 is a transverse vertical section taken in the plane of the line A A of Fig. 1 looking in the direction of the arrows, and Fig. 3 is a longitudinal section taken in the plane of the line B B of Fig. 2 looking in the direction of the arrows.

The pneumatic rotary piston-motor herein shown is denoted by 1 and may be of any well-known or approved construction—such, for instance, as that used for operating a drill. The feed-pipe of the motor is denoted by 2. This feed-pipe has mounted thereon an oil-reservoir 3. This oil-reservoir is free to be adjusted rotatably on the feed-pipe, so as to keep its supply of oil at all times in position to flow into the interior of the feed-pipe when permitted to do so by the controlling-valve. This reservoir is provided with a suitable filling-hole 4, which is closed by a removable cap 5. The opposite ends of that part of the reservoir which surrounds the air-feed pipe 2 is provided with packed bearings 6 and 7 for preventing the leakage of air at these points.

The feed-pipe 2 is provided with a shoulder 8, against which the nut 9 of the packed bearing 7 abuts, and a lock-nut 10 engages the nut 11 of the packed bearing 6 for clamping the oil-reservoir in any desired rotary position on the feed-pipe. A hollow valve-bushing 12 is screwed into the oil-reservoir, and its inner end is in open communication with an annular chamber 13, which surrounds the pipe 2 and which is at all times in communication with the interior of the pipe through ports 14. The bushing 12 is provided with a plurality of series of holes through its walls at different distances away from the feed-pipe 2, which holds open communication from the interior of the oil-reservoir to the interior of the valve-bushing. In the present instance four series of these holes are shown, (denoted, respectively, by 15 16 17 18.)

A cylindrical valve 19 is fitted to slide in the valve-bushing 12 and is normally held at the limits of its inward movement by a spring 20, interposed between the outer end of the valve and the bottom of the bore in which the valve slides. A set-screw 21 is arranged in the bushing in position to adjust the limit of outward movement of the valve 19. When the valve 19 is at the limit of its inward movement, it will close communication from the interior of the oil-reservoir to the interior of the air-feed pipe.

In operation when pressure is shut off from the feed-pipe no oil will be fed from the reservoir into the same. As the air is fed into the pipe 2 it will, because of the pressure escaping through the holes 14, force the valve 19 outwardly against the tension of the spring 20, and thus open one or more of the series of holes 15 16 17 18 for permitting the oil-reservoir to supply a greater or lesser amount of oil to the air within the feed-pipe. As above set forth, it will be seen that the amount of oil to be fed can be accurately adjusted by the set-screw 21, so that if it should be found that it is undesirable to open all of the holes in the valve-bushing by the air-pressure within the feed-pipe the valve 19 may be stopped in its outward movement before all of the said series of holes are opened.

It will be seen that the oiler constructed and arranged as above described may be rapidly adjusted, so that the valve 19 will always be below the level of the oil within the reservoir irrespective of the position in which the motor is placed for use. It will also be seen that the amount of oil to be fed to the air within the feed-pipe is regulated within certain limits by the pressure of the air within the feed-pipe and is absolutely cut off the moment pressure is cut off from the feed-pipe.

It is to be understood that this oiler is located on the feed-pipe between the inlet-motor and its throttle-valve.

What I claim is—

1. An automatic oiler for the air-feed pipe of a pneumatic motor comprising an oil-reservoir and a valve controlled by pressure within the pipe for opening and closing communication from the reservoir to the feed-pipe.

2. An automatic oiler for the air-feed pipe of a pneumatic motor comprising an oil-reservoir, a valve controlled by pressure from within the pipe for opening and closing communication from the reservoir to the feed-pipe and means for adjusting the opening movement of the said valve.

3. An automatic oiler for the air-feed pipe of a pneumatic motor comprising an oil-reservoir adjustably mounted on the pipe in a rotary direction and means controlled by pressure from within the pipe for opening and closing communication from the reservoir to the pipe.

4. An automatic oiler for the air-feed pipe of a pneumatic motor comprising an oil-reservoir adjustably mounted on the pipe in a rotary direction, an annular chamber surrounding the pipe, ports in the pipe communicating with the said chamber and a valve controlled by pressure within the pipe for opening and closing communication from the interior of the reservoir to the said annular chamber.

5. An automatic oiler for the air-feed pipe of a pneumatic motor comprising a reservoir, a tubular valve-bushing therein having holes therethrough at different distances from the feed-pipe and a valve fitted to slide in the valve-bushing toward and away from the feed-pipe, the movement of the said valve being controlled by pressure within the feed-pipe for opening and closing communication from the interior of the reservoir to the interior of the feed-pipe.

6. An automatic oiler for the air-feed pipe of a pneumatic motor comprising an oil-reservoir, a valve and a spring for holding the valve closed, the said valve being adapted to be opened by pressure from within the feed-pipe for opening communication from the interior of the oil-reservoir to the interior of the feed-pipe.

In testimony that I claim the foregoing as my invention I have signed my name, in presence of two witnesses, this 12th day of July, 1905.

ALBERT H. TAYLOR.

Witnesses:
C. S. SUNDGREN,
FREDK. HAYNES.